June 25, 1935.
J. E. HAGSTROM
2,005,781
TRAILER HITCH
Filed Sept. 4, 1931
2 Sheets-Sheet 1
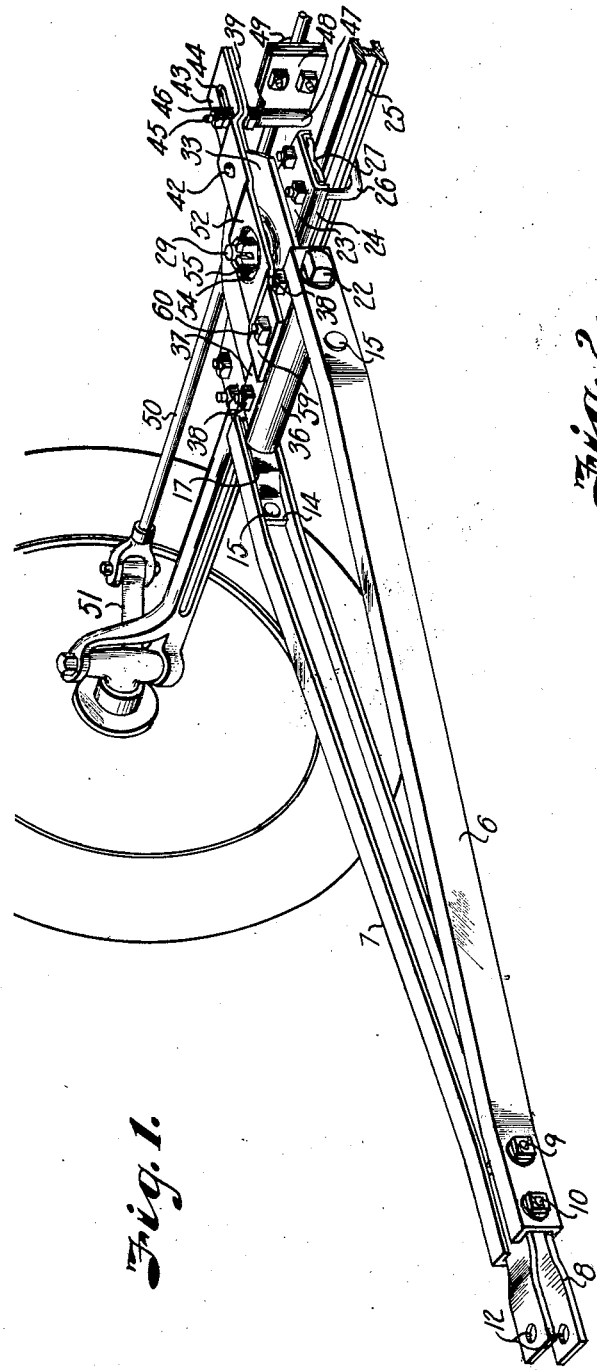
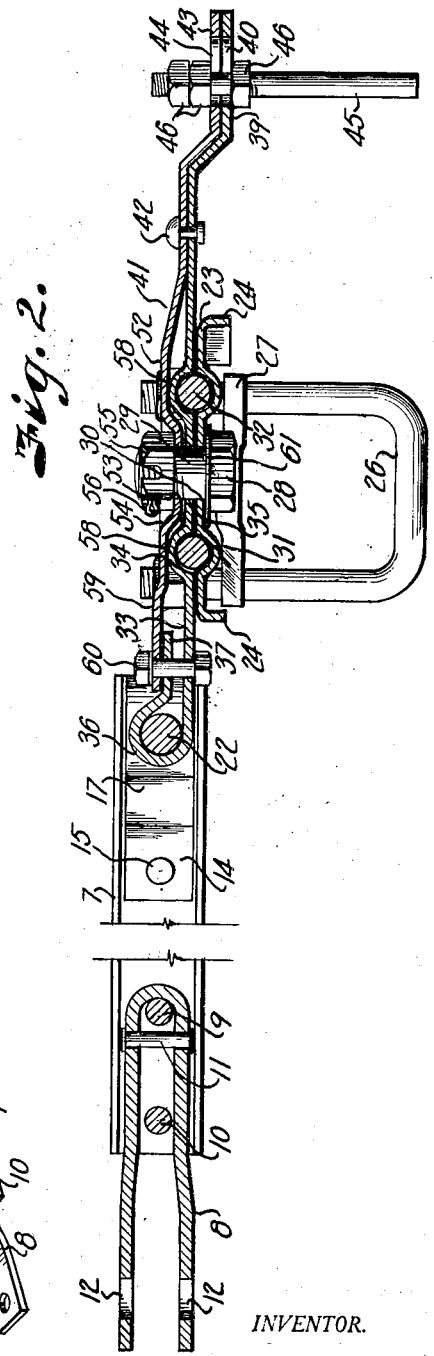
INVENTOR.
Joseph E. Hagstrom
BY
ATTORNEY.

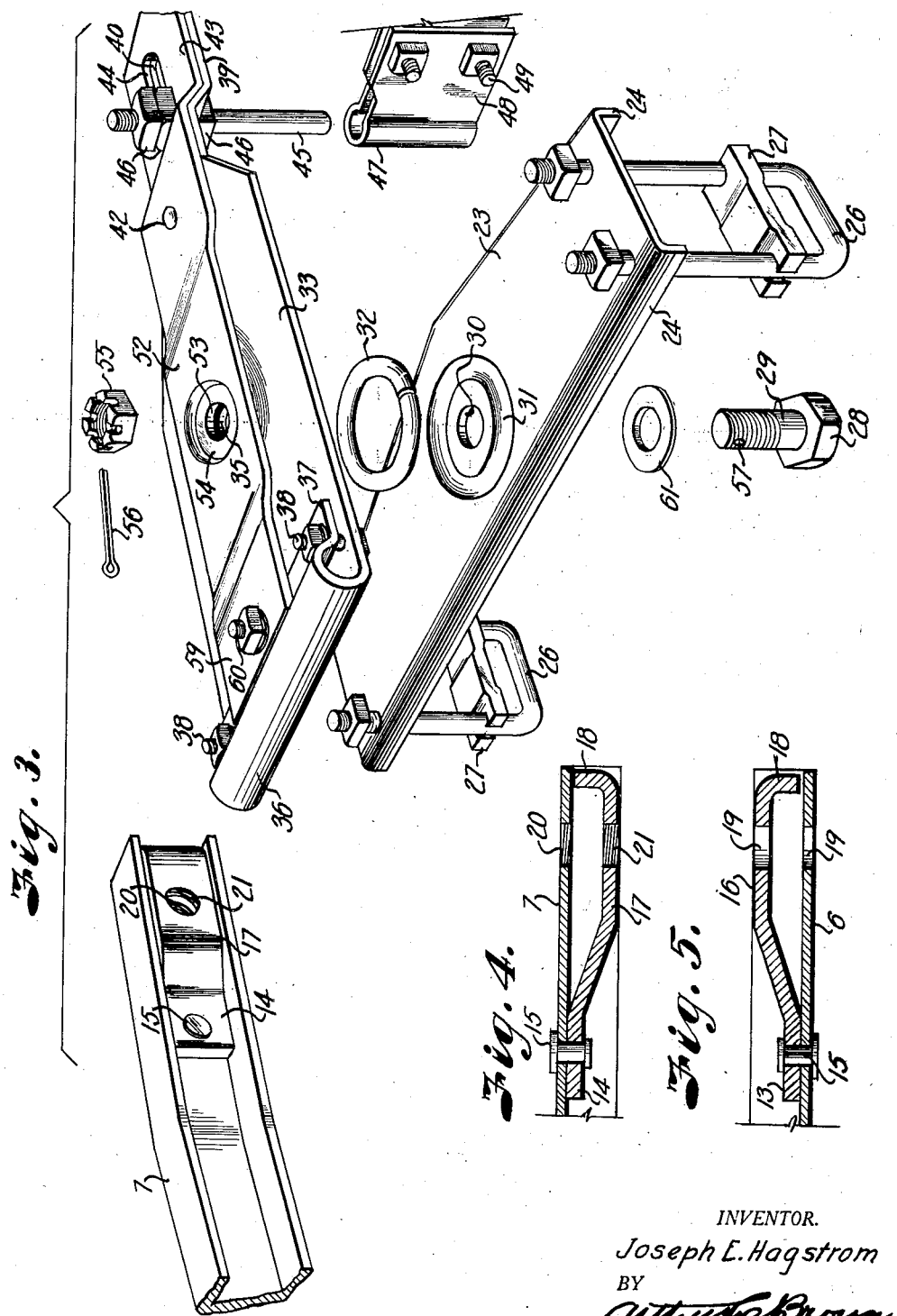

Patented June 25, 1935

2,005,781

UNITED STATES PATENT OFFICE 2,005,781

TRAILER HITCH

Joseph E. Hagstrom, Kansas City, Mo.

Application September 4, 1931, Serial No. 561,156

5 Claims. (Cl. 280—33.44)

My invention relates to improvements in trailer hitches and is designed primarily for use in connection with four wheel trailers.

My device is so constructed that a ring is used as a turntable, which ring also takes up all the pull thus eliminating all pull on the king bolt, and the only duty this bolt has is to take up wear of the turntable and hold the several adjacent parts together; in other words the king bolt in my structure has no shearing strain put upon it.

In former hitches the king bolt not only is used to take up wear between adjacent plates but also receives all of the pull of the load, and consequently must fit the holes in the plates snugly to avoid lost motion, but the constant turning of the plates due to weaving in and out of traffic and road turns will wear the bolt, which wear is increased by the pull in opposite directions of the plates. When such wear takes place, the plate which carries the tongue and which is also attached to the reach or connecting rod between the steering knuckles of the front wheels of the trailer no longer only pivots on the king bolt but moves sidewise. This movement is transmitted to the front wheels causing them to shimmy, which not only causes excessive wear on the tires, but also increases the wear on the king bolt and holes to such an extent as to cause the trailer to weave back and forth across the highway making such a trailer not only dangerous to traffic but rendering it difficult to keep it on the road, let alone in its proper traffic lane.

In the drawings:

Fig. 1 is a perspective view of my device showing the same attached to a portion of the truck of a trailer.

Fig. 2 is a longitudinal vertical section of my device with a part broken away.

Fig. 3 is a detail perspective disassembled view showing various parts in spaced position.

Fig. 4 is a longitudinal section of the rear portion of one of the tongue members, and Fig. 5 is a similar view of the rear portion of the remaining members.

Referring to the drawings:

6 and 7 are members comprising a tongue and are preferably formed of channels with their flanges turned inwardly. The members 6 and 7 converge toward their front ends which have a connecting link 8 interposed therebetween.

The connecting link is formed from a piece of flat material which is bent U-shaped and has the bolts 9 and 10 passed between its legs thus not only securing the front ends of the tongue together but also securing the link in position. A pin or bolt 11 passes through both legs of the link for preventing the same from sliding out of position and may be located between the bolts 9 and 10. The legs of the link are also provided with aligned openings 12 near their ends. This is for fastening the hitch to a preceeding vehicle or to a source of traction power not snown.

The rear ends of the tongue members are parallel to each other and relatively wide spread and have filler plates 13 and 14 secured to their inner faces by rivets or the like 15. The filler plates 13 and 14 have offset portions 16 and 17 respectively and downturned ends 18 which are normally spaced slightly away from the webs of the channels or members 6 and 7 so that they will exert a resilient pressure. Smooth aligned openings 19 are formed through the member 6 and plate 16 and aligned screw threaded openings 20 and 21 through the member 7 and plate 17. All of these openings are in alignment so that the bolt 22 can pass therethrough and have its threaded end secured in the openings 21 and 20 and then when a nut is secured on the end of the bolt, the bolt will work or turn with the tongue when it raises and lowers, thereby preventing wear by the narrow edges of the openings surrounding it.

A clamp plate 23 having depending flanges 24 formed along its longitudinal edges is adapted to be secured to the axle 25 of the trailer. The plate is provided adjacent its ends with openings through which the ends of U-bolts 26 pass. These bolts are adapted to pass around three faces of the axle 25 and also carry slidable spacing plates 27 which are interposed between the top of the axle 25 and lower face of the plate 23 and are for the purpose of preventing the head 28 of the king bolt 29 from contacting with the axle when the plate 23 is secured thereto.

The king bolt 29 passes through an opening 30 formed approximately in the center of the plate 23. The plate is also provided in its upper face with a circular depression 31, which is substantially semi-circular in cross section and is concentric with the opening 30.

Located in the depression 31 is a thrust ring 32. This ring 32 which may be split as shown in the drawings or may be solid, also acts as a turntable and receives all of the thrust or pull exerted during the use of the hitch, none of this being taken up by the king bolt.

A traction plate 33 is provided with a depression 34 which is of the same shape and size as the depression 31 to receive the upper portion of the ring 32. An opening 35 is formed through the plate 33 centrally of the depression 34 for the passage of the king bolt 29 therethrough. The forward end of the plate is bent to form a loop 36 which partially surrounds the bolt 22, thus forming a hinged connection with the tongue and with a rearward extension 37 which, as well as the plate 33, is provided with openings through which bolts 38 pass for securing the plate to the bolt 22 in such a manner that it can swing thereon and that wear of the plate and bolt 22 can be taken up. The rear end of the plate is provided with a downwardly offset portion 39 which has a longitudinally extending slot 40 formed therein.

A plate 41 is secured to the plate 33 by a rivet or similar fastening means 42 and has a rearwardly extending downwardly offset portion 43 lying flat on the portion 39 of the plate 33. The portion 43 is provided with a longitudinal slot 44 which registers with the slot 40. A pin 45 is slidably mounted in the slots 40 and 44 and is prevented from moving longitudinally by the nuts or similar means 46. The pin extends into an eye or loop 47 formed by bending the steering plate 48 upon itself. A U-bolt 49 has its ends extending through the plate 48 and is for the purpose of attaching it to the reach or connecting rod 50 which is connected at its opposite ends to the steering knuckles 51 of the front truck of the trailer.

The plate 41 is bent upwardly adjacent the fastening means forming a portion 52 which is parallel to and spaced from the plate 33. The portion 52 is provided with an opening 53 for the passage of the king bolt 29 therethrough and with a circular depression 54 concentric with the opening 53 for the reception of the castle nut 55 which is carried by the king bolt and is secured against rotation thereon by the cotter pin 56 which is passed through the opening 57 formed through the king bolt. This depressed portion is also surrounded by the raised portion 58 formed on the upper face of the plate 33 by the formation of the ring shaped depression 34, the part of the portion 52 surrounding the depression 54 bearing on the raised portion 58 of the plate 33 and imparting a downwardly directed thrust thereto when the king bolt nut is tightened.

The front portion 59 is upwardly offset so as to rest on the rearward extension 37 and a bolt 60 extends through this portion as well as the extension 37 and plate 33. This will prevent the front end of the plate from springing up when thrust is imparted to the ring 32 by backing of the pulling vehicle and also the thrust imparted thereto when going down hill or using brakes on the pulling vehicle.

A washer 61 may be interposed between the head 28 of the king bolt 29 and the clamp plate 23.

What I claim and desire to secure by Letters Patent is:

1. A trailer hitch comprising a clamping plate, a traction plate, means for pivotally securing said plates together intermediate their ends, a thrust ring surrounding said securing means and engaging with said plates so as to receive all thrusts imparted to said plates, a loop on the traction plate having a free end spaced from said plate, a tongue hingedly carried by said loop, a strap member extending over said traction plate and engaging the end of said loop to yieldingly resist hinging movement of the tongue, and a steering plate pivotally and slidably carried by said traction plate.

2. A trailer hitch comprising a clamp plate having an annular depression, means securing the plate to a vehicle axle, a ring member mounted in said depression, a traction plate mounted on said clamp plate and having an annular depression receiving the opposite face of said ring member, a loop formed on the front end of the traction plate and having a free end spaced therefrom, a bolt extending through said loop, a tongue carried by the bolt, a plate member extending across the top of said traction plate and having one end overlying the free end of said loop and its other end fixed to said traction plate, a bolt extending through the traction plate and said plate member to clamp the loop in frictional contact with the bolt carrying the tongue, and means extending through all of said plates to clamp the ring in said depressions.

3. A trailer hitch comprising a pair of opposing plates pivotally connected intermediate their ends, a loop member formed on the end of one of the plates, a tongue mounting member extending through said loop, a tongue connected with said tongue mounting member, and resilient plates carried by the tongue and yieldingly engaging the ends of said loop to take up lateral play between said tongue and the plate member.

4. In a towing hitch, a turn-table including a base member and a rotatable member rotatably mounted on said base member; a tongue hinged to said rotatable member, the hinge connection being formed by a part of said rotatable member bent to embrace a pivot member carried by said tongue; and adjusting means acting on said bent portion of the rotatable member for tightening said hinge connection.

5. In a towing hitch, a tongue having a hinge pin at one end thereof; a turn-table including a base member, and a rotatable member of sheet metal rotatably mounted on said base member and bent at one end around said hinge pin to constitute a hinge connection; and adjustable means for forcing the bent-around end of said plate into closer engagement with the hinge pin to take up looseness or wear.

JOSEPH E. HAGSTROM.